(12) United States Patent
Dahms et al.

(10) Patent No.: US 7,895,569 B2
(45) Date of Patent: Feb. 22, 2011

(54) SYSTEM AND METHOD FOR IMPLEMENTING SOFTWARE BREAKPOINTS IN AN INTERPRETER

(75) Inventors: John Fredric Arthur Dahms, Waterloo (CA); Anthony Fabian Scian, Waterloo (CA); Gregory Robertson Bentz, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 703 days.

(21) Appl. No.: 11/468,314

(22) Filed: Aug. 30, 2006

(65) Prior Publication Data

US 2008/0250397 A1 Oct. 9, 2008

(51) Int. Cl.
*G06F 9/44* (2006.01)
(52) U.S. Cl. ...................................... 717/114
(58) Field of Classification Search .................. 717/114
See application file for complete search history.

(56) References Cited

U.S. PATENT DOCUMENTS

| | | | | |
|---|---|---|---|---|
| 5,093,914 A | * | 3/1992 | Coplien et al. ............... | 717/129 |
| 7,653,899 B1 | * | 1/2010 | Lindahl et al. .............. | 717/128 |
| 2002/0104076 A1 | * | 8/2002 | Shaylor ....................... | 717/148 |
| 2002/0112116 A1 | * | 8/2002 | Nelson ........................ | 711/103 |
| 2003/0149961 A1 | * | 8/2003 | Kawai et al. ................. | 717/129 |
| 2004/0205728 A1 | * | 10/2004 | Hanson ....................... | 717/129 |
| 2005/0257089 A1 | * | 11/2005 | Williams et al. .............. | 714/34 |
| 2006/0041788 A1 | * | 2/2006 | Brock et al. .................. | 714/34 |
| 2006/0069959 A1 | | 3/2006 | Schultz | |
| 2006/0174163 A1 | | 8/2006 | Gravoille et al. | |
| 2006/0174225 A1 | * | 8/2006 | Bennett et al. .............. | 717/124 |
| 2007/0033577 A1 | * | 2/2007 | Arackal ....................... | 717/124 |

* cited by examiner

*Primary Examiner*—Anna Deng
(74) *Attorney, Agent, or Firm*—Gowling Lafleur Henderson LLP

(57) ABSTRACT

A method for implementing software breakpoints in a software program to be executed by a interpreter, comprising the steps of executing a look-up, in a main loop of the interpreter, the look-up function searching a list of breakpoint addresses to determine whether a breakpoint instruction is to be executed at the address referenced by the interpreter's current instruction pointer instead of the program instruction, and maintaining, in memory, the list of breakpoints addresses separately from the program code, such that the breakpoint list can be altered separately from the program code.

9 Claims, 3 Drawing Sheets

SYSTEM AND METHOD FOR IMPLEMENTING SOFTWARE BREAKPOINTS IN AN INTERPRETER

This application relates generally to software debuggers, and more particularly to a system and method for implementing software breakpoints in an interpreter based debugger.

BACKGROUND

Interpreter based software differs from regular (e.g., compiled) executable programs that are converted (compiled, assembled and linked) from source code to machine-code instructions which can be run directly on a computer system. A program written in an interpreted program language (Java™ is an example of an interpreter-based language) is compiled from source code into an intermediate code which is intepreted by an interpreter (the Java™ byte-code interpreter is referred to as the Java™ virtual machine— Java™VM). The interpreter does not perform compilation of source code as a whole into machine-executable instructions. Rather, the interpreter retrieves instructions referenced by its instruction pointer and performs a line-by-line execution of the program, by interpreting one program statement (e.g., Java bytecode) at a time, executing it, and then proceeding to the next statement. Programs running in interpreters are inherently slower than compiled executables.

A debugger needs to be able to set a breakpoint in the target code. Debuggers are usually part of the development environment. Software breakpoints are typically an instruction (usually a special breakpoint opcode) inserted in the code at a desired breakpoint location. When properly implemented the debugger remembers the instruction that was at the breakpoint address, replacing it after the code hits any breakpoint.

With certain target execution environments, such as handheld devices, debugging of target code must be performed by loading the program on the device and then running the program within a debugger support module on the device. The debugger support module is normally integrated with the development environment and knows how to handle breakpoints set in the development environment, allowing a developer to add change and observe breakpoints while the program is running in debug mode on the target device. One of the limitations, is that the target program must be loaded into flash type memory on the device. Typically an individual bit stored in the programmed memory cell of a flash memory cannot, be changed from the programmed state back to an un-programmed state without erasing all the bits of a section (e.g. page, block, entire memory chip) of the memory cells. Accordingly if new breakpoints are inserted; the flash memory sometimes has to be completely erased and rewritten with the new breakpoint or existing breakpoints may not be conveniently and selectively erased without erasing the target program and rewriting it to flash without the breakpoint.

Accordingly there is need for a system and method for implementing software breakpoints which allows for more efficient setting and clearing of breakpoints and which has minimal impact on the target code being debugged.

BRIEF DESCRIPTION OF THE DRAWINGS

These and other features of the present invention will become more apparent in the following detailed description in which reference is made to the appended drawings by way of example only, wherein.

DETAILED DESCRIPTION OF THE PREFERRED EMBODIMENTS

Figure 1:
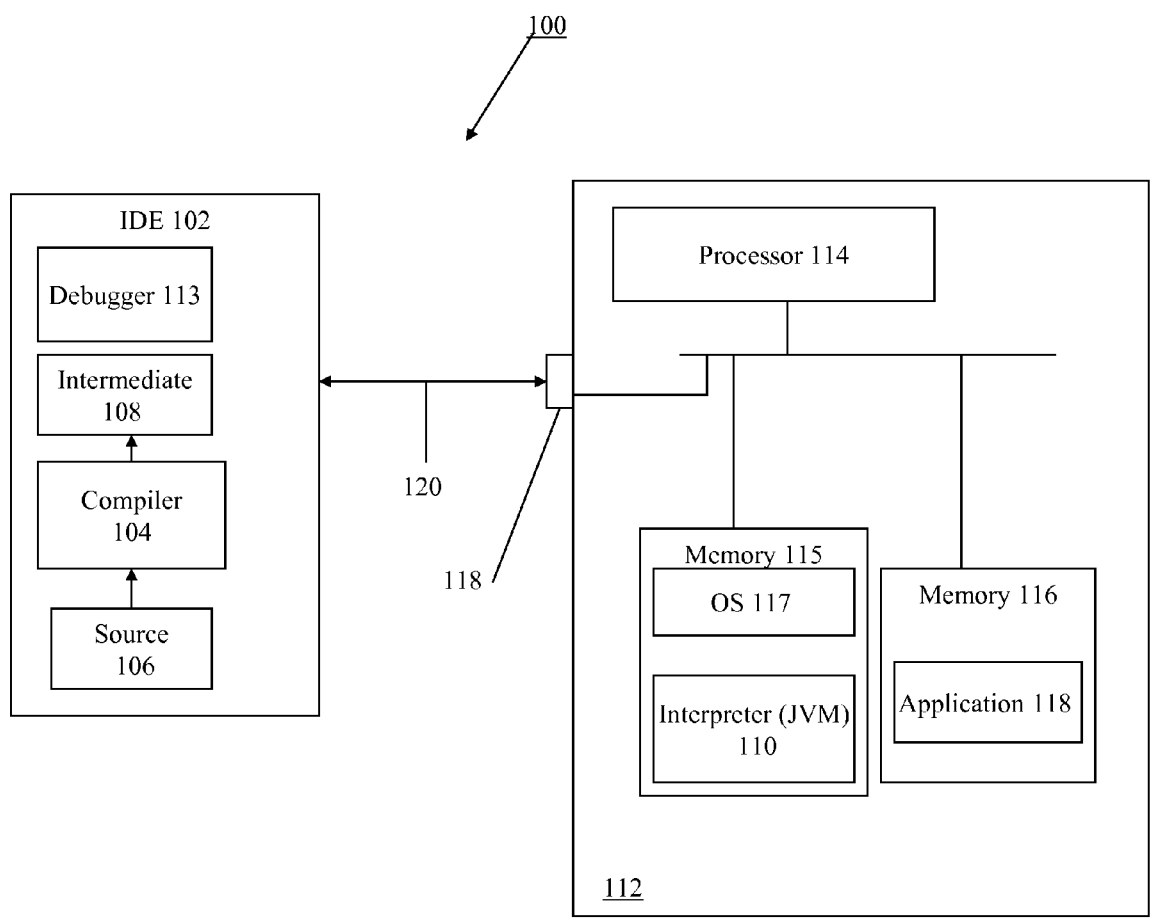
FIG. 1 is a block diagram of a debugging environment.

In the following description like numerals refer to like structures in the drawings.

In accordance with a first aspect of this matter, there is provided A method for implementing software breakpoints in program code to be executed by an interpreter, comprising the steps of executing a look-up function, in a main loop of the interpreter, the look-up function for searching a list of breakpoint addresses to determine whether a breakpoint instruction is to be executed, at an address referenced by the interpreter's current instruction pointer, instead of an instruction in the program code; and maintaining, in memory, the list of breakpoint addresses separately from the program code, such that the list of breakpoints can be altered separately from the program code.

In accordance with a second aspect there is included the step of comparing the address referenced by the current instruction pointer to test variables, that define a range if consecutive address which are instruction addresses in the program code that are free of breakpoints and only performing a the breakpoint look-up function, if the current instruction pointer is outside the range.

In accordance with a further aspect, the look-up function includes a binary search function for searching a sorted list of the breakpoint addresses.

In accordance with a still further aspect when the binary search fails, a pair of successive breakpoints addresses from the breakpoint list are returned, the returned addresses define an upper and lower bound value for the test variables defining the range of breakpoint free addresses in the program code.

In accordance with another embodiment of the further aspect, the look-up function includes a linear search function for searching a sorted list of the breakpoint addresses.

In accordance with an aspect of the present invention there is provided an interpreter that maintains test variables defining a range if consecutive address which are instruction addresses in the program code that are free of breakpoints and the interpreter compares the current instruction pointer to the test variables and only performs a look-up of the list of breakpoints, if the current instruction pointer is outside the range.

In accordance with another aspect of the invention there is provided a computer readable medium having instructions for performing a method for implementing software breakpoints in program code to be executed by an interpreter, the method comprising executing a look-up function from a main loop of said interpreter, the look-up function for searching a list of breakpoint addresses to determine whether a breakpoint instruction is to be executed, at an address referenced by said interpreters current instruction pointer, instead of an instruction of the program; and maintaining, in memory, said list of breakpoints addresses separately from the program code, such that said list of breakpoints can be altered separately from the program code.

In accordance with a still further aspect there is provided a method for debugging program code to be executed by an interpreter, the method comprising the steps of creating a list of breakpoint addresses associated with the program code to be debugged; storing the list of breakpoints addresses separately from the program code in a memory of a target device; executing a look-up function from a main loop of said interpreter, the look-up function for searching the list of breakpoint addresses to determine whether a breakpoint instruction is to be executed, at an address referenced by said interpreter's current instruction pointer, instead of an instruction of the program.

Referring to FIG. 1, there is shown components of a software development system 100. The software development system 100 includes a development environment 102 having a compiler 104 for compiling source code 106 of a software application program into some form of intermediate code 108 (e.g. bytecodes) which can be executed by an interpreter 110 on an appropriate target device 112 and a debugger 113. The device 112 includes a processor 114, memory 115 for storing an operating system 117, device applications and data, non-volatile memory 116 (such as flash memory) for storing the application programs 118 to be executed by the interpreter 110, and an interface 118 for communication with the development environment 102 (other components such as keyboards ROM displays etc. are not shown). The debugger 113 running in the development environment allows a user to set and clear debugging breakpoints in the target code 106. The breakpoints can usually be set or cleared remotely from the debugger 113 via a link 120 to the device 110.

In a preferred embodiment the development environment 102 is the Java™ Development Environment (JDE), which provides a fully integrated development environment (IDE) and simulation tool and debugger for developing software application programs that can be deployed to Java technology-enabled mobile devices. In a typical implementation the JDE can test software programs by running them in a device simulator (typically on a personal computer) or load them onto a connected mobile device running a Java™ Virtual Machine (JVM). As mentioned above, some form of erasable non-volatile memory 116, typically flash memory, in the device stores the program code 118 being debugged. Software breakpoints are inserted in-line with the program code and stored in code segments of the flash memory. As mentioned earlier it is not convenient to write an clear breakpoints in the target program when run from with some types of memory devices such as flash memory, since the entire code segment must be erased and rewritten.

Accordingly one solution to the problem according to an embodiment of the present matter is to maintain a list of breakpoints that are linked to the addresses in the program code, such that the breakpoint list can be stored separately from the program code.

Figure 2:
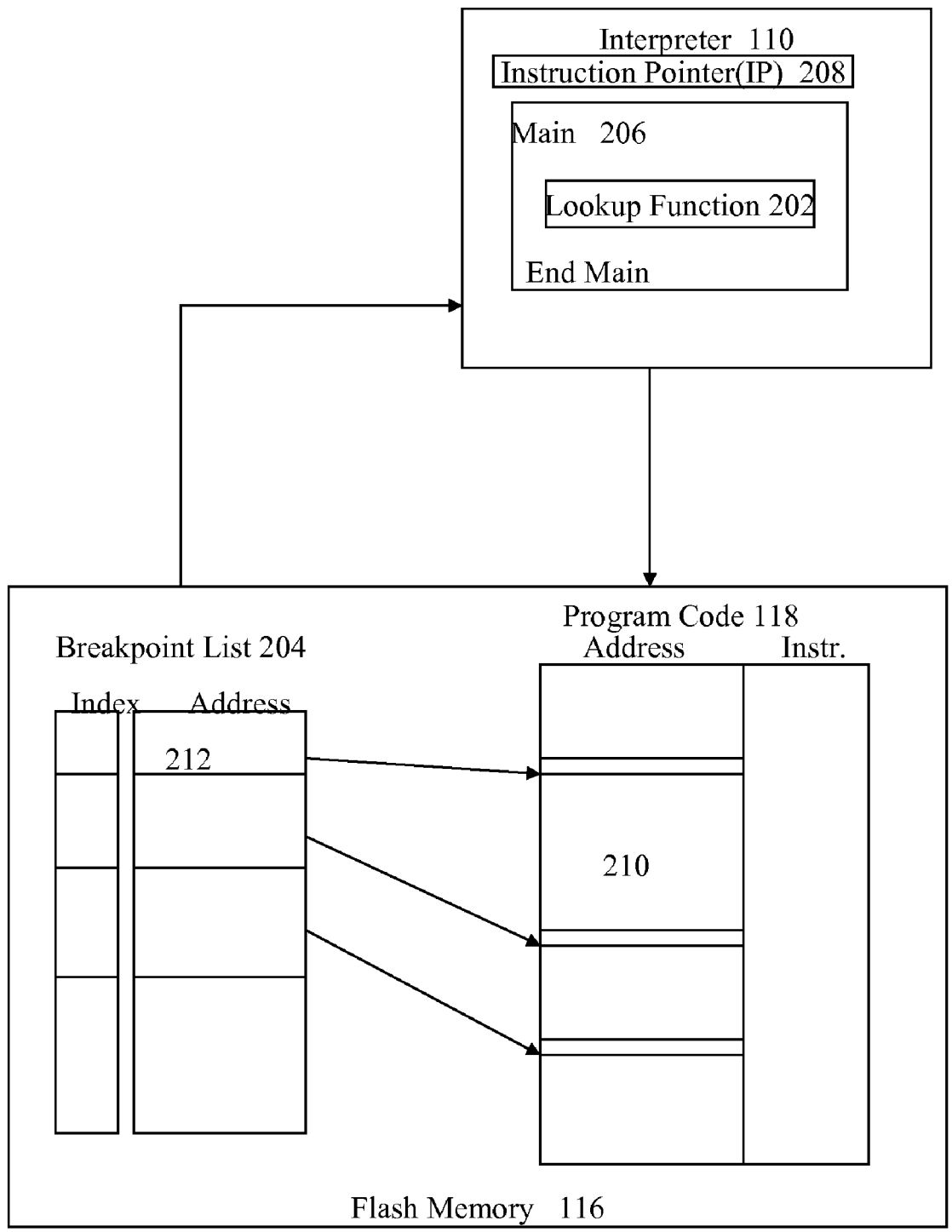
FIG. 2 is a block diagram of an embodiment of the present matter.

Accordingly, referring to FIG. 2 there is shown schematically the relevant components of the system 100 which have been modified for implementing software breakpoints according to an embodiment 200 of the present matter. The system 200 comprises a list of breakpoint addresses 204 stored separately from the program code 118 in memory 116 and the interpreter 110 having a break-point list look-up function 202 in its main execution loop 206, for reading the list of breakpoint addresses 204 to determine whether a breakpoint instruction is to be executed at the address referenced by the interpreters current instruction pointer 208 instead of the program instruction 210. The list of breakpoints 204 include address 212 that point to addresses (either absolute or offset) in the target program code 118 where breakpoints are to be executed. The program code 118 and the list of breakpoints 204 are stored in a manner in the memory 116 such that the breakpoints can be modified without having to erase and rewrite the program code 118 in memory 116.

The look-up function 202 will typically determine whether the instruction pointer is pointing to a breakpoint address or not by employing a search routine which searches the list of breakpoint address for the address of the current instruction pointer. Such search could be a well known binary search or a linear search, although the binary search has a faster convergence and is preferred.

One of the limitations of the above embodiment 200 is that in some instances where code execution efficiency is important, in a debugging mode, the list 204 must be accessed and a search performed through the list of breakpoints for each iteration of the interpreter 110, to determine whether a breakpoint has been set at the current instruction pointer (IP) address 208. If a large number of breakpoints have been set then this can add many instruction cycles to each line of code executed by the interpreter.

Figure 3:
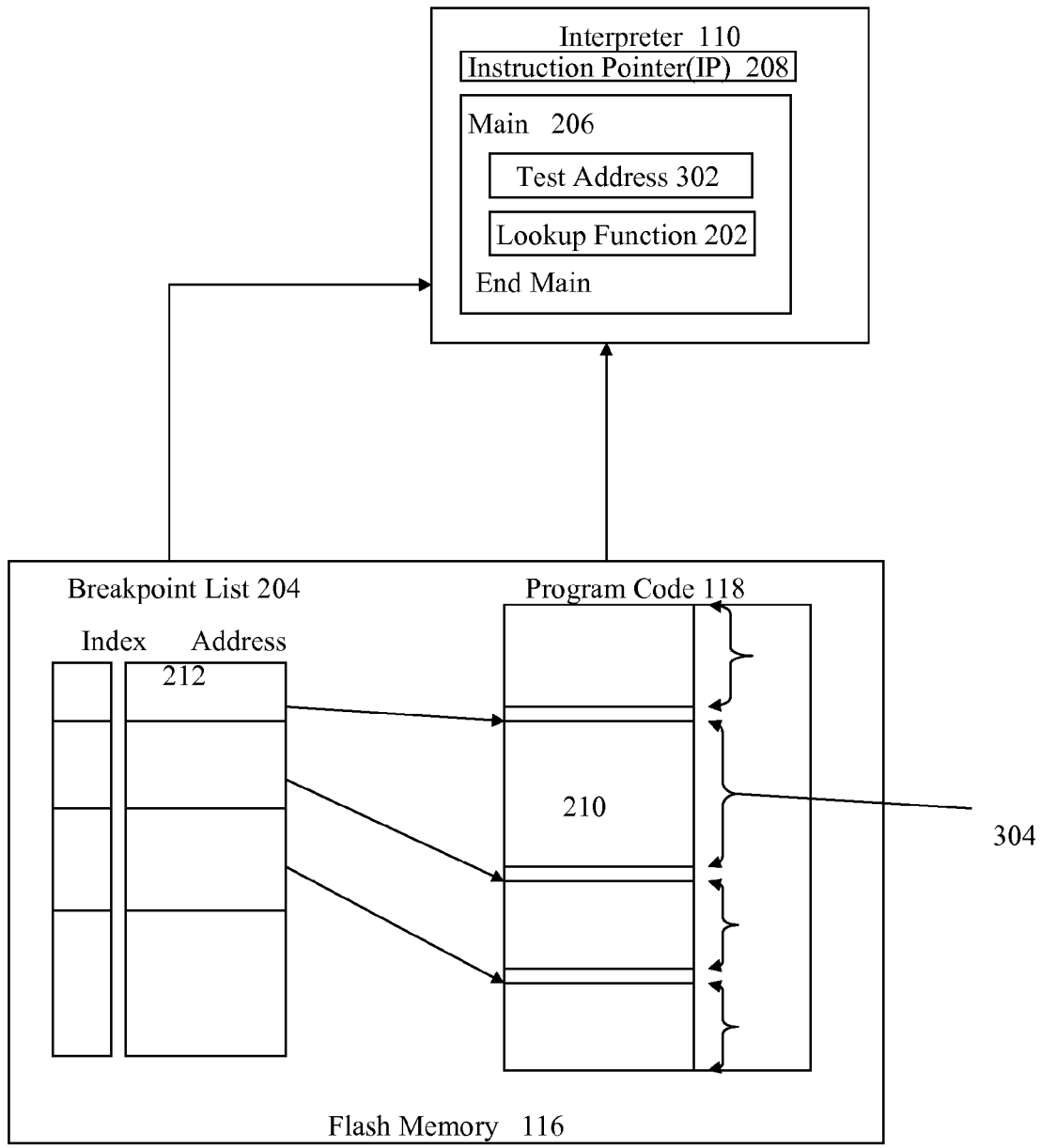
FIG. 3 is a block diagram of a further embodiment of the present matter.

Accordingly, referring now to FIG. 3 there is shown a further modification of the system 200 in accordance with another embodiment 300 of the present matter that attempts to overcome the above described disadvantage. The system 300 includes a test address function 302 in the main execution loop 206 for comparing the current instruction pointer 208 to test variables (a method for updating these variable is described later) before executing the breakpoint list look-up function 202. The test variables define a range of consecutive instruction addresses 304 (the numeral 304 points to one range, although there may be more than one range of consecutive addresses that are free of breakpoints) in the program code 118 that are free of breakpoints. The interpreter 110 performs a look-up function 202 of the list of breakpoints 204, only if the current instruction pointer 206 is outside the range of addresses 304.

In a preferred embodiment the test variable function includes a pair of variables that represent an upper and lower bounds (lo, hi) of the address range 34 that indicates that there are no breakpoints in the address range from the lo to hi addresses. Accordingly, before implementing a search (e.g. binary) of the list 204, the interpreter 110 first performs a comparison such that lo<=IP<=hi. If the address of the IP is in the lo and hi addresses, then the interpreter 110 assumes that there is no software breakpoint in that range and the target code continues to execute. A comparison such as the above executes in significantly fewer instruction cycles than a full search of the breakpoint list. The use of the pair of variables increases the efficiency of using the list, since the lookup (checking for software breakpoint addresses) has to occur in the main interpreter loop which will slow down execution of the target code if the software breakpoint addresses of the entire list were to be compared during each comparison with the address of the current instruction pointer. As will be appreciated, the test variables hi and lo can be inclusive or exclusive. i.e. the test could be any of lo<IP<=hi or lo<IP<hi or lo<=IP<hi.

One method for the test variables hi, lo to be updated to reflect a breakpoint free address range as follows. As described earlier, in a preferred embodiment the look-up function 202 may implement a binary search. A binary search algorithm is a known technique for finding a particular value in a sorted linear array, by ruling out half of the data at each step. A binary search finds the median, makes a comparison to determine whether the desired value comes before or after it, and then searches the remaining half in the same manner. For example,

```
public int binarySearch( int a[ ], int key )
{
// a is an array of breakpoint addresses
    int low = 0;              //set index of lowest element in the array
    int high = a.length - 1;  //zero based array, a.length is the number
```

```
                            //of elements in the array – high is set to
                            //the index of the highest element in the array
    int middle;             //is the index of the median element in
                            //portion of the array being searched
    while( low <= high )
    {
        middle = ( low + high ) / 2; //find the median
        if( key == a[ middle ] ) //match
            return middle;
        else if( key < a[ middle ] )
            high = middle – 1;      //search low end of array
        else
            low = middle + 1;       //search high end of array
    }
    return –1;                  //search key not found
}
```

Accordingly, when the binary search fails, a pair of successive breakpoint addresses are returned by the search. The binary search array elements a[high] or a[low] will have the last breakpoint address in the comparison before the search failed. These returned addresses are used to define an upper and lower bound value for the test variables hi, lo (how the returned address are assigned to the test variables will be determined by how the range test, above is performed) defining the range of breakpoint free addresses in the program code. Accordingly, the look-up function 202 may include the routine to update the test variables after it performs a search through the breakpoint list.

The software breakpoint addresses are maintained in the list sorted by address. Accordingly, following the execution workflow each address of the IP is compared to the variables hi, lo. In the case where the interpreter 110 determines that the IP is less than lo or is greater than hi, then the interpreter 110 resorts to doing a search of the list 204 (e.g. a binary search). If the search succeeds (i.e. a software breakpoint address is encountered in the list 204 corresponding to the current IP) then execution of the target code is interrupted and the breakpoint is serviced. On the contrary, if the search fails (i.e. a software breakpoint address is not found which corresponds to the current IP) then new values can be set for lo and hi variables, such that lo<=IP<=hi is based on the point/address in the binary search of the list at which the search failed in a manner as described above. To simplify the case where IP<=the smallest entry in the table or hi>=the largest entry in the table, it may be convenient to insert dummy entries in the table for location 0 and infinity. It is recognized that due to the nature of program execution during target code debugging, the instruction pointer is likely to remain within the address range represented by the test variables for many subsequent lookups by the interpreter. Thus, the search of the list may only have to be done on occasion.

As will be appreciated, the plurality of software breakpoint addresses will typically be created by the user through the IDE, the IDE will generate the breakpoint list 204 and a debugger support module on the device will be responsible for storing the target code and breakpoint list in the non-volatile memory 116 of the device. The debugger support module will initialize the variable hi, lo, for example lo is set to infinity and hi is set to 0 to provide an initial address range. The interpreter will then begin its main execution loop. The interpreter first compares the current address of the instruction pointer with the test variables, determines that IP is less than lo or is greater than hi and if so initiates a search of the list. If the search fails then the variables are updated with at least a pair of addresses in the breakpoint address list. Execution of the target code continues with the IP being compared with the test variables at each iteration of the interpreter loop. If the interpreter determines that a breakpoint has been reached (result of a successful search) and control of the target code execution is handed to the debugger 113. The developer may then manipulate/view data registers, set new/clear breakpoints etc. If the developer alters the breakpoints in some way, then the breakpoint list can be updated accordingly without interfering with the program code 108.

It is recognized that using the above-described operation, the user can go on debugging the target code without having to wait to perform a sometimes time consuming erase cycle of the non-volatile memory to remove breakpoint instructions from the opcodes. In this fashion, the user debugs and optimizes system and software operation by only manipulating the contents of the breakpoint list, which can be stored in the volatile memory of the device.

As mentioned briefly above, setting of the software breakpoint addresses in the list can be done via the debugger tool in the IDE. It should be recognized that this is contrary to the traditional way of setting breakpoints by overwriting the corresponding opcode of the target code at selected addresses with a physical software breakpoint (e.g. a trap, illegal divide, or some other instruction that will cause an exception).

Various modifications, adaptations, and combinations of various features of the described embodiments can be practiced without departing from the scope of the invention as set forth in the claims.

We claim:

1. A method of implementing software breakpoints in program code to be executed by an interpreter, comprising the steps of:
   maintaining, in memory, a list of breakpoint addresses separately from a program code, such that the list of breakpoints can be altered separately from the program code;
   comparing a current instruction pointer of the interpreter to test variables, the test variables defining a range of consecutive addresses of instructions in the program code that are free of breakpoints; and
   when the current instruction pointer is outside said range, executing a look-up function, for searching the list of breakpoint addresses to determine whether a breakpoint instruction is to be executed, at an address referenced by the current instruction pointer, instead of an instruction in the program code;
   wherein if the current instruction pointer corresponds to one breakpoint address of the list of breakpoint addresses, executing the breakpoint instruction;
   wherein if the current instruction pointer corresponds to none of the list of breakpoint addresses, updating the test variables.

2. A method as defined in claim 1, said look-up function including a binary search function for searching a sorted list of said breakpoint addresses.

3. A method as defined in claim 2, including returning, a pair of successive breakpoints addresses from the list of breakpoints if said binary search fails, the returned addresses for defining an upper and lower value for said test variables.

4. A method as defined in claim 1 said look-up function including a linear search function for searching a sorted list of said breakpoint addresses.

5. A non-transitory computer readable medium storing instructions or statements for execution in a computer for performing a method of implementing software breakpoints in program code to be executed by an interpreter, the method comprising:

maintaining, in memory, a list of breakpoint addresses separately from a program code, such that the list of breakpoints can be altered separately from the program code;

comparing a current instruction pointer of the interpreter to test variables, the test variables defining a range of consecutive addresses of instructions in the program code that are free of breakpoints; and when the current instruction pointer is outside said range, executing a look-up function for searching the list of breakpoint addresses to determine whether a breakpoint instruction is to be executed, at an address referenced by said current instruction pointer, instead of an instruction of the program code;

wherein if the current instruction pointer corresponds to one breakpoint address of the list of breakpoint addresses, executing the breakpoint instruction;

wherein if the current instruction pointer corresponds to none of the list of breakpoint addresses, updating the test variables.

6. A method of debugging program code to be executed by an interpreter, said method comprising the steps of:

creating a list of breakpoint addresses associated with the program code to be debugged;

storing said list of breakpoints addresses separately from the program code in a memory of a target device;

comparing a current instruction pointer of the interpreter to test variables, the test variables defining a range of consecutive addresses of instructions in the program code that are free of breakpoints; and when the current instruction pointer is outside said range, executing a look-up function for searching said list of breakpoint addresses to determine whether a breakpoint instruction is to be executed, at an address referenced by said current instruction pointer, instead of an instruction of the program code;

wherein if the current instruction pointer corresponds to one breakpoint address of the list of breakpoint addresses, executing the breakpoint instruction;

wherein if the current instruction pointer corresponds to none of the list of breakpoint addresses, updating the test variables.

7. A method as defined in claim 1, comprising:

updating the test variables based on the list of breakpoint addresses.

8. A computer readable medium as defined in claim 5, the method comprising:

updating the test variables based on the list of breakpoint addresses.

9. A method as defined in claim 6, comprising:

updating the test variables based on the list of breakpoint addresses.

* * * * *